O. O. FENWALL.
TUG RELEASING DEVICE FOR WHIFFLETREES.
APPLICATION FILED APR. 23, 1908.

920,302.

Patented May 4, 1909.
2 SHEETS—SHEET 1.

WITNESSES:
A. H. Opsahl.
R. P. Hicks.

INVENTOR:
Ole O. Fenwall.
By his Attorneys
Williamson Merchant

THE NORRIS PETERS CO., WASHINGTON, D. C.

O. O. FENWALL.
TUG RELEASING DEVICE FOR WHIFFLETREES.
APPLICATION FILED APR. 23, 1908.
920,302.
Patented May 4, 1909.
2 SHEETS—SHEET 2.
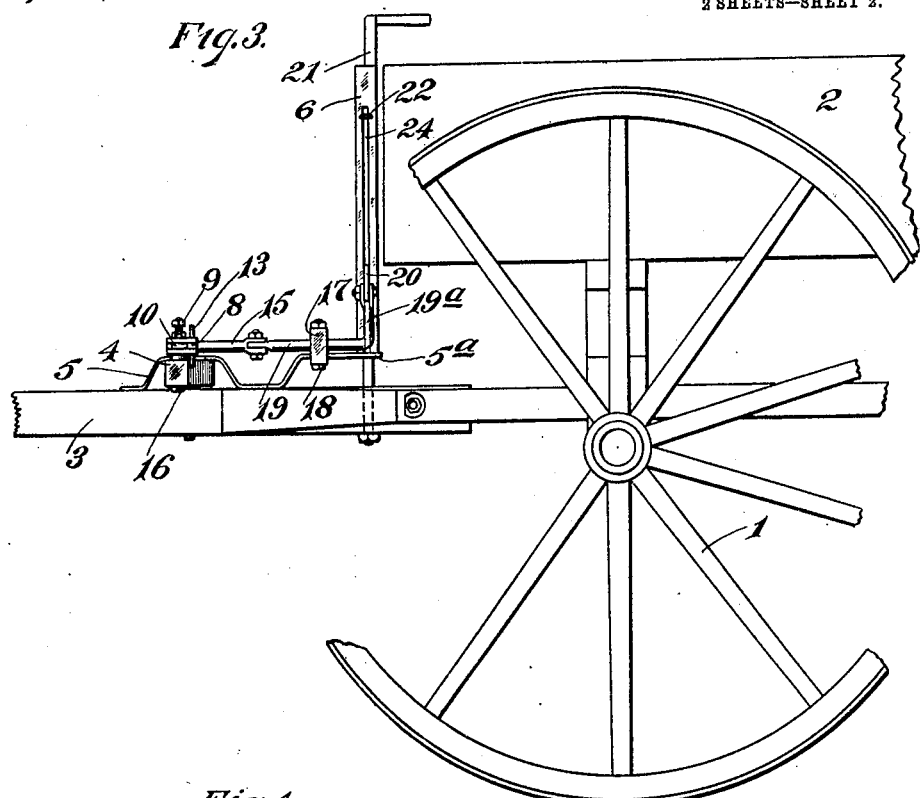
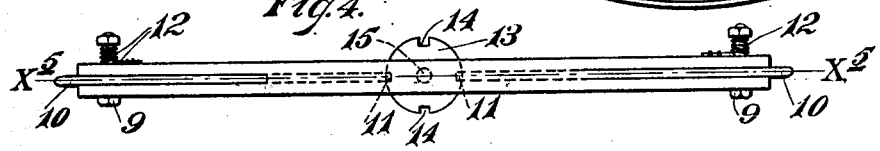
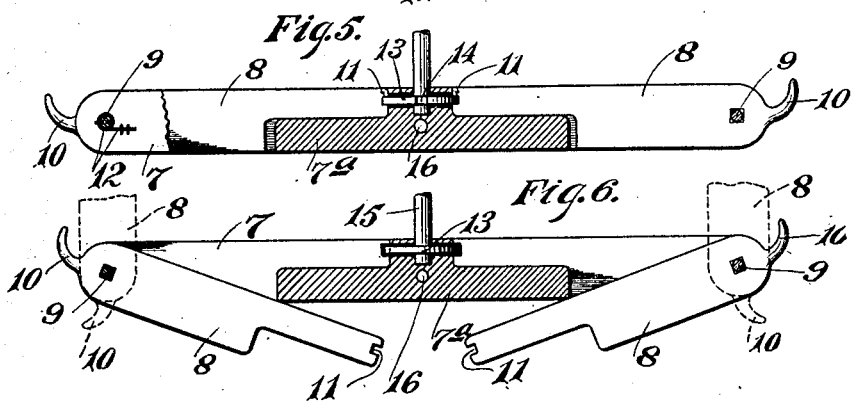
Witnesses:
W. H. Souba.
Harry Opsahl.
Inventor:
Ole O. Fenwall.
By his Attorneys:
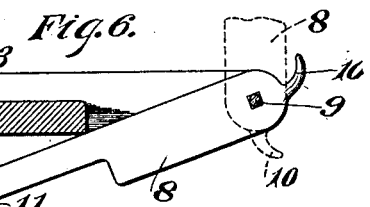

UNITED STATES PATENT OFFICE.

OLE O. FENWALL, OF BROOTEN, MINNESOTA.

TUG-RELEASING DEVICE FOR WHIFFLETREES.

No. 920,302.  Specification of Letters Patent.  Patented May 4, 1909.

Application filed April 23, 1908. Serial No. 428,855.

*To all whom it may concern:*

Be it known that I, OLE O. FENWALL, a subject of the King of Norway, residing at Brooten, in the county of Stearns and State of Minnesota, have invented certain new and useful Improvements in Tug-Releasing Devices for Whiffletrees; and I do hereby declare the following to be a full, clear, and exact description of the invention, such as will enable others skilled in the art to which it appertains to make and use the same.

My invention has for its object to provide a simple and efficient tug releasing device for whiffletrees; and to this end, it consists of the novel devices and combinations of devices hereinafter described and defined in the claims.

The purpose of the invention is to provide a simple and efficient means for releasing a horse or horses from a vehicle when the driver has lost control thereof, so as to thereby prevent serious accidents due to runaways.

It also has for its object to accomplish this result without doing any damage to the horses released.

Horse releasing devices, hitherto provided, have usually uncoupled the whiffletree from the vehicle, and when this is done, the horse released is liable to do itself very great damage by kicking against the released whiffletree or the part of the vehicle left coupled to the horse.

In the accompanying drawings, which illustrate my invention, like characters indicate like parts throughout the several views.

Figure 1:
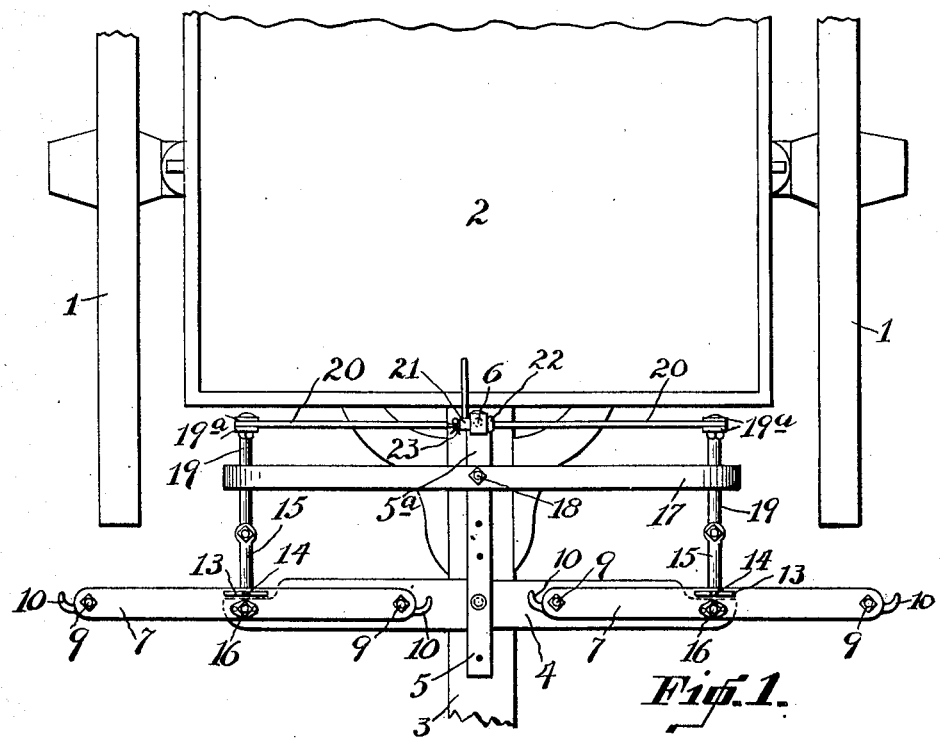
Figure 2:
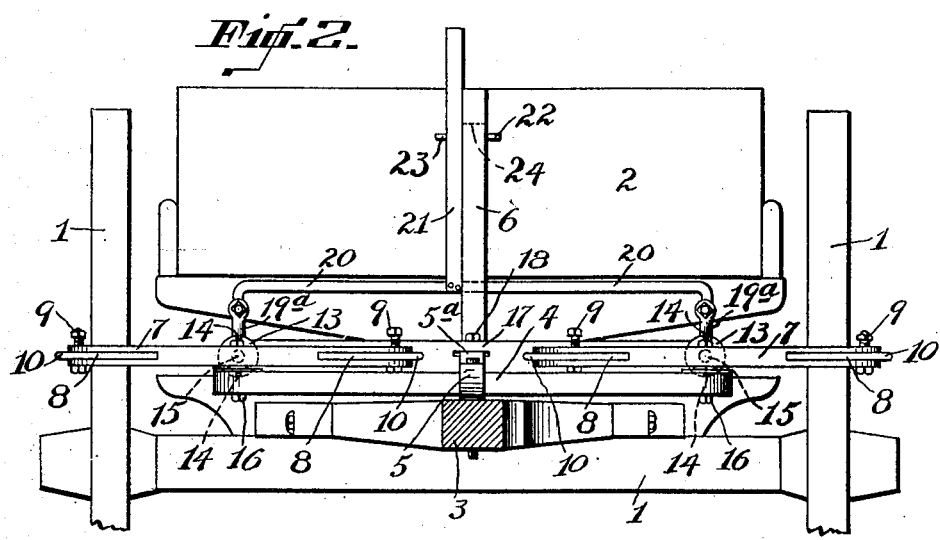

Referring to the drawings; Figure 1 is a plan view, with some parts broken away, illustrating my invention applied to an ordinary wagon. Fig. 2 is a front elevation of the parts shown in Fig. 1, some parts being broken away and some parts being sectioned. Fig. 3 is a side elevation of the parts shown in Figs. 1 and 2, some parts being broken away. Fig. 4 is a front elevation showing one of the whiffletrees removed from working position. Fig. 5 is a horizontal section taken on the line $x^5$ $x^5$ of Fig. 4, some parts being left in full; and Fig. 6 is a view corresponding to Fig. 5, but showing the pivoted levers of the whiffletree turned from their operative into inoperative positions.

Of the parts of the wagon, the numeral 1 indicates the running gear, the numeral 2 the box and the numeral 3 the pole of a wagon of standard construction. In the application of my invention to a wagon having a pole a two-horse equalizing beam 4 is pivotally connected to the pole 3 in the usual or any suitable way, but the said pole is preferably provided with a rigidly secured metal strap 5 that overlies the intermediate portion of said equalizing beam 4 and is provided with a raised rear end extension $5^a$, to which and the rear end of the pole 3 an upright standard 6 is rigidly secured just forward of the front end of the wagon box 2, for a purpose which will presently appear.

The whiffletrees are each preferably constructed as follows: The bodies 7 are made up of vertically spaced parallel bars rigidly connected at their central portions by spacing bodies $7^a$, best shown in section in Figs. 5 and 6. Working between the end portions of the said whiffletree are levers 8 pivotally connected thereto, as shown, by nutted bolts 9. At their short ends the levers 8 are provided with tug-engaging hooks 10, and at their reduced long ends they are provided with lock notches 11. The bolts 9 have square sections that engage the levers 8 so that they are caused to turn therewith, and the said levers are put under strain to move from their normal positions, shown in Fig. 5, into their inoperative positions, shown in Fig. 6, by torsional springs 12 anchored at their upper ends to the said bolts 9 and at their lower ends to the body of the whiffletree. In the central portion of each whiffletree a lock wheel or disk 13 is rotatively mounted. These lock wheels are provided with releasing notches 14 and each is rigidly secured to the forward end of a short shaft or trunnion 15. At their longitudinal centers the bodies of the whiffle-trees are pivotally connected to the ends of the equalizing beam 4 by means of bolts or pintles 16.

Located parallel with but at the rear of the equalizing beam 4 is a second beam 17 that is centrally pivoted to the metal strap by a bolt 18. The short shafts 19 are loosely journaled in the outer ends of the beam 17, and these, at their forward ends, are pivotally connected to the rear ends of the short shafts or trunnions 15. At their rear ends, the shafts 19 are provided with upwardly extended crank arms $19^a$ that are connected to the downturned ends of a tie bar 20. The bar 20 is sufficiently flexible to permit oscillatory movement of the equalizing bar 4 and the beam 17. At its central portion the tie bar 20 is rigidly secured to an upright hand bar 21. The hand bar 21 is adapted to be detachably secured or locked to the fixed upright 6 by any suitable means, but is preferably thus secured by a bolt 22 having a flat head at one end and a split key 23 at its other end. When the flat head of the bolt 22 is turned into a vertical position it is adapted to be inserted through a vertical slot 24 of the fixed upright 6; and, when it is turned crosswise of said slot, as shown in Fig. 3, it serves to lock the hand bar 21 to the said upright.

When all of the parts are in operative positions, as best shown in Figs. 1, 2, 4 and 5, the lock disks or wheels 13 engage the notches 11 in the ends of the hook-equipped levers 8 and thereby lock the said levers in their operative positions with the hooks turned backward, as best shown in Fig. 5.

When it is desired to release the tugs and allow the horses to run clear of the wagon it is first necessary to turn the lock bolt 22 so as to uncouple the hand bar 21 from the fixed upright 6. This being done, the said hand bar should be moved toward the left in respect to Figs. 1 and 2, so as to move certain of the notches 14 with the lock disks 13 into alinement with the inner ends of the levers 8, and this will release the said levers and permit the same to make nearly a complete rotation, to-wit, to move from the position shown in Fig. 5 into the position shown in Fig. 6. The levers in making this movement under forward strain of the tugs, cause the hooks 10 to release the tugs, thereby, of course, releasing the horses from the vehicle. The horses thus released will not be coupled to any part of the vehicle, and, hence are of course in no danger of being hurt by the loose tugs.

The device above described, while extremely simple and of small cost, is highly efficient for the purposes had in view. It has an obvious importance as a means for preventing accidents when control of a horse or horses is lost by the driver.

What I claim is:

1. A whiffletree provided with levers mounted on approximately vertical pivots and having notched ends and tug engaging hooks, a notched lock disk rotatively mounten in the central portion of the body of said whiffletree, on an approximately horizontal axis, the body portion of said lock disk being engageable with the notches of the inturned ends of said levers to lock the same in operative positions, and the notches of said disk serving to release the said levers, substantially as described.

2. The combination with an equalizing beam, of a pair of whiffletrees pivotally connected thereto, and provided with tug engaging levers mounted on approximately vertical pivots and having notched ends, notched lock disks rotatively mounted on approximately horizontal axes in the body portions of the whiffletrees and operative to lock the notched inturned ends of said levers in operative positions, and the notches of said disks serving to release said levers, and a connection for rotating said lock disks to simultaneously release the levers of said two whiffletrees, substantially as described.

3. The combination with a wagon, of beams 4 and 17 pivotally connected to the pole thereof, whiffletrees pivoted to the ends of said beam 4, each whiffletree having a pair of pivoted tug-engaging levers, a notched lock disk applied to each whiffletree for locking and releasing said levers, a jointed shaft carried by said beam 17 and connected to the respective lock disks, said shafts having crank arms at their rear ends, a tie bar connecting said crank arms, a hand bar secured to said tie bar, an upright carried by said pole, and means for locking said hand bar to said upright and for releasing the same, substantially as described.

In testimony whereof I affix my signature in presence of two witnesses.

OLE O. FENWALL.

Witnesses:
 M. F. CLEINS,
 CARL KNUTSON.